US005631080A

United States Patent [19]

Fugitt

[11] Patent Number: 5,631,080
[45] Date of Patent: May 20, 1997

[54] METHOD FOR FLOCCULATING CLAY AND COMPOSITION PRODUCED THEREBY

[75] Inventor: Gary Fugitt, Chillicothe, Ohio

[73] Assignee: The Mead Corporation, Dayton, Ohio

[21] Appl. No.: 516,535

[22] Filed: Aug. 18, 1995

Related U.S. Application Data

[63] Continuation-in-part of Ser. No. 410,911, Mar. 27, 1995, abandoned.

[51] Int. Cl.$^6$ .................... B32B 5/16; B32B 29/00; C08K 3/34
[52] U.S. Cl. .................... 428/331; 252/315.5; 524/446; 428/537.5
[58] Field of Search .................... 524/446; 252/315.5; 428/331, 537.5

[56] References Cited

U.S. PATENT DOCUMENTS

| | | | |
|---|---|---|---|
| 3,674,529 | 7/1972 | Toms | 106/306 |
| 3,759,729 | 9/1973 | Fahn | 524/446 |
| 3,804,656 | 4/1974 | Kaliski et al. | 106/308 |
| 4,075,030 | 2/1978 | Bundy et al. | 106/288 |
| 4,076,548 | 2/1978 | Bundy et al. | 106/288 |
| 4,078,941 | 3/1978 | Bundy et al. | 106/308 |
| 4,346,178 | 8/1982 | Economou | 501/148 |
| 4,569,768 | 2/1986 | McKinley | 210/727 |
| 4,624,982 | 11/1986 | Alexander | 524/446 |
| 4,738,726 | 4/1988 | Pratt et al. | 106/308 |
| 4,772,332 | 9/1988 | Nemeh et al. | 106/487 |
| 4,859,246 | 8/1989 | Sennett | 106/487 |
| 4,943,324 | 7/1990 | Bundy et al. | 106/486 |
| 5,085,707 | 2/1992 | Bundy et al. | 106/486 |
| 5,168,083 | 12/1992 | Matthews et al. | 501/146 |
| 5,198,490 | 3/1993 | Berg et al. | 252/315.5 |

FOREIGN PATENT DOCUMENTS

| | | |
|---|---|---|
| 2000653 | 4/1990 | Canada . |
| 0245553 | 7/1986 | European Pat. Off. . |
| 3707221 | 9/1988 | Germany . |
| 1497280 | 4/1991 | United Kingdom . |
| WO93/04118 | 3/1993 | WIPO . |

*Primary Examiner*—Veronica P. Hoke
*Attorney, Agent, or Firm*—Thompson Hine & Flory LLP

[57] ABSTRACT

The invention is a method for flocculating clay including the steps of preparing a dispersion of a processed clay containing a polymer as a flocculating agent. The polymer is present in an amount sufficient to cause bridging of particles of the clay in the dispersion by the polymer. Then the dispersion is mixed to cause the polymer to bridge the particles and the particles flocculate. The invention also includes a structured clay produced by this method.

17 Claims, 13 Drawing Sheets

Figure 1A. The Change in Particle Size Distribution (as Measured by SediGraph 5000) of a Fine U.S. Kaolin Clay Due to the Addition of a 1.5M Molecular Weight, Low Charge Density Anionic Polymer.

Figure 1B. The Change in Particle Size Distribution (as Measured by SediGraph 5000) of a Fine U.S. Kaolin Clay Due to the Addition of a 1.5M Molecular Weight, Low Charge Density Anionic Polymer.

Figure 1C. Increase in Particle Packing Volume of a Fine Clay With the Addition of an Anionic Polymer (mol. wt. = 1.5 million)

Figure 1D. Increase in Scattering Coefficient (577 nm wavelength) of a Fine Clay With the Addition of an Anionic Polymer (mol. wt. = 1.5 million)

Figure 2. Coated Paper Opacity Improvement Obtained By addition of an Anionically Structured Clay Using an Anionic Polymer with Low Charge Density and Molecular Weight of 1.5 Million.

Figure 3A. Effect of Anionic Polymer Addition On Particle Size Distribution of Fine Clay (molecular weight of 800,000)

Figure 3B. Effect of Anionic Polymer Addition On Particle Size Distribution of Fine Clay (molecular weight of 800,000)

Figure 4A. Increase in Particle Packing Volume of a Pigment Blend With the Addition of an Anionic Polymer (mol. wt. = 800,000)

Figure 4B. Increase in Pigment Slurry Low Shear Viscosity With the Addition of an Anionic Polymer (mol. wt. = 800,000)

Figure 5A. Increase in Particle Packing Volume of a Paper Coating With the Addition of an Anionic Polymer (mol. wt. = 800,000)

Figure 5B. Increase in Coating Low Shear Viscosity With the Addition of an Anionic Polymer (mol. wt. = 800,000)

Figure 7. Increase in Printed Gloss Due to the Addition of an Anionic Polymer (molecular weight of 800,000)

METHOD FOR FLOCCULATING CLAY AND COMPOSITION PRODUCED THEREBY

CROSS-REFERENCE TO RELATED APPLICATION

This is a continuation-in-part of U.S. application Ser. No. 08/410,911 filed Mar. 27, 1995 now abandoned.

FIELD OF THE INVENTION

The present invention relates to a novel method for preparing a structured clay composition useful as a coating on paperboard or as a filler in paper, and a composition produced thereby.

More particularly, the present invention relates to a novel method for preparing a pigment composition using a high molecular weight polymeric bridging agent to flocculate the particles within the composition and compositions produced thereby.

In another aspect of the present invention, the method for preparing the clay uses a low molecular weight polymer in order to selectively flocculate the fines in the clay without significantly increasing the number of large particles in the distribution.

BACKGROUND OF THE INVENTION

Finely divided refined kaolin is widely used as a pigment to provide a glossy, white, opaque surface finish on printing paper. In order to manufacture the refined kaolin pigments, several steps are required. These include particle size fractionation, purifying crude clay while the clay is in the form of a fluid deflocculated aqueous slurry, bleaching the clay while in a flocculated state, filtering the flocculated clay to remove liquid water and then dispersing the flocculated clay in water to form a high solids slurry that is marketed as such or is dried, usually in a spray dryer, to provide a dry refined pigment capable of being mixed with water to form a dispersed fluid suspension.

Conventionally, kaolin clay pigments are applied as aqueous "coating colors" which comprise a clay pigment, a dispersing agent for the clay, a suitable binder such as a polymer latex, starch, or mixtures thereof and other minor additives. The viscosity of the high solids suspension of the clay coating pigment must be sufficiently low to permit mixing and pumping. After the binder is added, the resulting coating color must also have suitable viscosity for handling and application to the paper sheet. In addition, the coating should impart good opacity, gloss, brightness and printability to the finished paper. The coatings are applied at high machine speeds and therefore require the use of high solids, typically 70%. A dispersing or deflocculating agent is present in the clay in order to improve the fluidity of the composition. Typical deflocculating agents include sodium condensed phosphate salts or sodium polyacrylates.

When clays are received by the paper manufacturer they are already highly processed. The crude clay has been fractionated, metallic debris has been removed, the brightness of the clay has been adjusted, and the clay has been washed in a drum filter to provide a washed filtercake. A clay which has been beneficiated to this extent is herein referred to as a "processed clay". The processed clay pigments are chemically modified to impart a surface charge to the particles which provides a repulsive force which keeps the particles in a dispersed state. The processed clay can be made anionic or cationic by the addition of a dispersing agent. Clays are usually anionically dispersed. Each particle of clay is chemically modified to carry a similar negative charge, which produces a repulsive force and keeps the particles in a dispersed state.

Conventionally, clay flocculation is induced by adding a flocculating agent which carries a charge opposite the surface charge of the pigment to the dispersion to cause the particles to attract and form agglomerates. Flocculation of the particles is induced by neutralizing or reducing the charge on the particles so they no longer repel one another but aggregate. This is known in the art as "charge reduction" flocculation.

Various methods of preparing a coating composition by adding a charge reduction agent to flocculate the clay are known in the art. U.S. Pat. Nos. 4,772,332 to Nemeh et al. and 4,859,246 to Sennett both teach a method for stabilizing a slurry of anionic clay pigments by adding a water-soluble cationic agent and at least one anionic sulfonate to flocculate the clay particles by neutralizing the clay particle's charge. The cationic agent is a polyelectrolyte flocculant and more specifically polyamides or quaternary ammonium polyelectrolytes.

U.S. Pat. No. 3,804,656 to Kaliski et al. teaches a method for stabilizing a clay suspension using charge alteration. A water soluble nonionic surface active agent, a cationic surface active agent, and a strong base are mixed to create a suspension. The suspension is added to a dispersion of particles to reduce the charge on the particles.

U.S. Pat. No. 4,569,768 to McKinley teaches a method for flocculating solids in a cationic clay by a charge reduction mechanism. The method comprises contacting the slurry with a water soluble polymer having an anionic character, and then with a water soluble polymer having a cationic character. This method clarifies an acidic slurry and is useful in mining operations.

The British Patent No. 1,497,280 to Portland Cement Manufacture's Limited teaches a clay treatment which is designed such that the clay dispersion can be introduced to the wet end of the paper machine whereupon, in the presence of the acid or hard water, the clay flocculates onto the fibers. This however, does not yield a colloidally stable dispersion in a flocculated clay. The central mechanism of flocculation is introducing the ionically dispersed clay to a high acidic environment which contains multivalent cations. The flocculation is caused by a combination of salt effects and charge reduction. This method could not be used in a coating. The presence of multivalent cations (hard water) would cause the entire coating to flocculate to a degree that it would not flow sufficiently to be pumped or applied to paper. In the Portland patent, the addition of the dispersion to the solution of cations forces flocculation. The anionic polymers are much higher in molecular weight than those used to produce a solid stable coating in the present invention. These polymers typically have molecular weights ranging from 4M to 5M and are used as retention aids. By using polymers with such high molecular weights, the coatings are too thick and do not flow.

D. I. Lee, "Coating Structure Modification and Coating Hold-Out Mechanisms", 1981 TAPPI Coating Conference Preprint, teaches a method for flocculating clay particles using different electrolyte combinations in a clay suspension to adjust the particle's charge. The electrolytes increase the ionic strength of the clay suspension and decrease the repulsion of particles. This change in the charge allows the attraction forces to dominate and creates particle stability.

European Patent 0,245,553 to Pratt et al. teaches a method for flocculating the particles in a coating slurry by adding a small amount of water soluble cationic polyelectrolyte flocculant to prepare a bulked clay pigment. The resulting flocculated product can be dispersed to form a high solids, clay-water slurry to be used as a coating composition or filler for paper.

The above-mentioned charge reduction and charge alteration methods for flocculating pigments have several drawbacks. Adding a charge reduction flocculating agent to a coating composition increases the composition's viscosity and limits the level of the flocculating polymer used. Traditional flocculation approaches used flocculants whose flocculating abilities were, in a sense, too intense causing undesirably high thickness, viscosity, and ionic properties for use as paper coatings. Also, they often do not have a high enough solids composition to be used as suitable paper coatings.

U.S. Pat. Nos. 4,943,342; 5,085,707; and 5,168,083 all assigned to Georgia Kaolin Company, Inc. teach "defined" clays. These references teach particle size adjustment by removing a portion of the fine fraction by physical or chemical means. These methods are used typically for coatings with opacifying pigments.

It is the applicant's discovery that by using a polymer which might be considered to be a poor flocculating agent and which does not reduce the charge on the particle, one can produce a colloidally stable suspension of flocculated pigment for use in paper. The clays can be used as fillers or in coatings. In accordance with the invention, fluid flow properties are improved, higher solids is achieved and there is less interaction with the other materials in the coating by the anionic or nonionic polymer.

SUMMARY OF THE INVENTION

In accordance with the present invention, a method of making a flocculated clay is provided comprising the steps of preparing a dispersion of a processed clay in water containing a polymer as a flocculating agent in an amount sufficient to cause bridging of the clay particles in said dispersion by said polymer and mixing said dispersion to cause said polymer to bridge said particles and said particles to flocculate.

In accordance with another object of the present invention, a clay is provided which has been flocculated by the above method.

In accordance with a further object of the present invention, a method for making a coated paper is provided comprising the steps of preparing an aqueous suspension of anionically dispersed clay; adding thereto a flocculant in an amount sufficient to cause flocculation of the suspension by bridging particles of said dispersed clay with said flocculant; drying the flocculated clay to provide a slurry suitable for coating; preparing a paper coating composition from said slurry; and coating said composition on paper.

In accordance with another object of the present invention, a flocculated clay is provided which comprises anionic clay particles bridged by an anionic or nonionic polymer having a molecular weight in the range of about 400,000 to about 1.5M.

The clay of the present invention is believed to be flocculated by a mechanism which is distinct from conventional clays. This mechanism is referred to as "bridging". Bridging is distinguished from charge reduction flocculation in that the flocculating agent does not alter the charge on the particles. Instead, the flocculating agent is a bridging agent which appears to function as a coagulant or "mesh" whereby the pigment particles become entangled or lodged within the strands of polymer of the bridging agent. The term "bridging" is inclusive of polymer entanglement. Because, in the typical case, the pigments carry an anionic surface charge, flocculation is not caused by charge reduction since the polymers have the same or a neutral charge. In addition, the bridging with lower molecular weight polymers allows selective flocculation of the fine portion, while charge reduction is not selective.

The bridging method of the present invention, represents a comparatively inexpensive process for increasing opacity of the coating, as will be described herein.

Prior art structured clays prepared by charge reduction treatment with a cationic polymer, are disadvantageous. They are generally not available in solids concentrations greater than about 60%, which is less concentrated than is normally desired in a paper coating. If a solids concentration higher than 60% is used, the slurry is too viscous to handle and must be thinned by dilution. Slurries of these clays are not satisfactory for use in many paper coatings because they cannot be diluted for application to the surface of the paper and still meet the opacity, gloss, brightness, and printability for useable paper coatings. The reason conventional structured clay dispersions only contain about 60% solids is that the addition of the cationic polymer destabilizes the particles and the particles do not flow as well. When one adds more water to the conventional dispersions in order to obtain the viscosity and fluid flow characteristics that are desired for coating or fillers, the quality of the coated surface is adversely affected (i.e., gloss, print quality) and the drying demand of the coating process is increased, limiting production speeds.

In contrast, dispersions produced in accordance with the present invention can be obtained in concentrations greater than 60% solids, preferably 64–70%. A higher concentration can be obtained because the addition of an anionic polymer does not destabilize the charge on the particles. As a result, well dispersed flocculation can be obtained at higher solids content. This, in turn, produces a better coating or filler.

The clays are flocculated in accordance with the present invention, using a polymer entanglement vehicle in place of charge reduction. This is advantageous because the polymers used to flocculate the clays are not cationic and they have little effect on the functionality of other additives for the paper coating.

DESCRIPTION OF THE INVENTION

The present invention provides a method for flocculating the particles of clay using a flocculating agent which induces flocculation through a bridging or entanglement action instead of charge alteration or charge reduction. This method is referred to herein as bridging flocculation or polymer entanglement. It is advantageous because addition of the present flocculant does not produce the steep increase in product viscosity that accompanies the charge reduction flocculants. In addition, there is less interaction of the polymers with the other materials in the coating.

In the method of the present invention, polymers are added to the clay dispersion or to a coating composition containing the clay dispersion which have molecular weights in the range of about 400,000 to about 1,500,000. They are nonionic or anionic in nature and are added as the flocculants to the anionic dispersed clay.

The present invention more particularly includes two embodiments, namely, one embodiment in which the flocculating agent has a molecular weight in the range of 750,000 to 1.5M and the other in which the flocculating agent has a molecular weight in the range of 400,000 to 600,000. The properties of the coatings and coating compositions obtained in these two embodiments are different. Coating compositions are generally bulkier, exhibit greater layer thickness per unit weight, and provide better coverage of the fibers when the pigment has been flocculated with polymers having molecular weights ranging from 750,000 to 1.5M. On the other hand, a smoother sheet having better ink gloss and ultimately better print quality, but not opacity generally results when the pigment has been flocculated with polymers having molecular weights ranging from 400,000 to 600,000. Strictly speaking the former embodiment yields a structured or bulked clay whereas the latter yields a particle size adjustment in the clay.

The method of the present invention can be used to prepare a flocculated clay useful in a coating or as a filler in paper. The method in its most basic form comprises the steps of preparing a dispersion of clay having an anionic surface charge containing a flocculating polymer to cause bridging of the clay particles. The dispersion is prepared by adding a dispersant to a processed clay and subjecting the clay to high shear mixing. The flocculating polymer can be added to the clay at the same time as the dispersant or the polymer can be added in a subsequent step. If the polymer is added in a subsequent step, the clay with the polymer added is subjected to additional high shear mixing.

The anionic or nonionic flocculating agent is added to the clay in an amount sufficient to bridge flocculate the particles. The clay dispersion containing the polymer can be subjected to high shear mixing using a Cowles mixer. It is sheared for a sufficient time to uniformly distribute the polymer and cause flocculation. This is typically 10–15 minutes. The flocculated pigments may range in particle size from about 10 to about 0.1 microns. If the low molecular weight flocculating polymer is utilized, the particle size ranges from about 10 to about 0.25μ. The minimum particle size increases without substantially affecting the maximum particle size as explained below.

The anionic or nonionic flocculating agent is typically added to the clay dispersion before it has been dried and formulated into a coating composition, but, in another embodiment, it may be added to a coating composition containing the clay. The amount of polymer added will vary with the degree of treatment and will depend on the particular application for the clay filler or coating.

The flocculating agent is typically added to a clay dispersion in an amount of 0.1 to 1 part per 100 parts clay on a dry basis. If the polymer is added to a coating composition, the amount of polymer needed to flocculate the clay typically doubles because the polymer must also interact with the other materials in the coating. It has been found that substantially higher amounts of polymeric flocculant can be used in the present invention than could be used in charge reduction methods.

The amount of anionic or nonionic flocculating polymer used to treat the clay may vary with characteristics of the polymer including charge density and molecular weight, the particle size distribution and solids content of the clay and the degree of structure desired. Increased charge density of the polymer will increase the colloidal stability of the resulting flocs by giving them a greater effective surface charge. Increased molecular weight increases the degree of the effect and the resulting effective particle size. Increasing molecular weight, however, will generally decrease the amount of polymer that can be used for a given set of conditions. The initial particle size distribution will also affect the amount of polymer needed to obtain a desired particle size distribution.

The viscosity of the clay slurry will initially increase upon polymer addition because the polymer acts as a liquid phase thickener. In contrast, viscosity will decrease as the polymer is evenly distributed, becomes absorbed, and lays flat on the particle surfaces. It is the slurry solids prior to polymer addition which will determine how much initial viscosity increase can be tolerated by the mixing system.

Nonionic polymers are believed to work as flocculants in the same fashion as the anionic polymers. The original charge on the anionic clay is believed to be responsible for stabilizing the suspension.

In accordance with the present invention, the flocculating polymer is an anionic or nonionic polymer having a molecular weight of about 400,000 to 1,500,000. Higher molecular weights can be used, such as 6M for nonionic polymers. However, above 1.5M, the dispersion tends to flocculate in a nonhomogeneous manner. The flocculation and the thickening effect is so strong that only a very small amount can be added. In some cases, only a portion of the slurry comes into contact with the polymer and the effect is not homogeneously distributed.

In one embodiment, the flocculating polymer is an anionic or nonionic polymer having a low molecular weight (about 400,000 to 600,000). Low molecular weight polymers selectively flocculate the fines in clays. This is believed to occur since the polymer chain is only long enough to attach to or bridge the small clay particles and not the larger particles. In this way the percentage of fines is greatly reduced, but the percentage of larger particles is relatively unaffected since the polymers only affect the small particles. There is a shift in the particle size distribution to greater particle size without increasing substantially the maximum particle size. Therefore, there is a narrower particle size distribution.

By using such lower molecular weight flocculating polymers, the small particles (i.e. less than 1 micron) will flocculate. This range molecular weight polymer is particularly effective in flocculating particles of 0.1 to 0.25 micron. The polymer will convert these fines into particles ranging from 0.5 to 2 microns. The amount of larger particle formation is negligible.

In a second embodiment, the flocculating polymer is a high molecular weight (about 750,000 to 1.5M) nonionic or anionic polymer. High molecular weight polymers flocculate the clay by attaching themselves to any of the clay particles (i.e., not just the small particles), forming a bridge. Using high molecular weight polymers, the entire particle size distribution shifts to greater sized particles. The shape of the particle size distribution curve remains essentially the same but the curve is shifted.

Conventional dispersants are useful in the invention such as Colloids 211 and Dispex N-40 (sodium polyacrylates). These dispersants have a molecular weight range of about 2,000 to 8,000, and are used in amounts of 0.1 to 1 part per hundred figured as dry dispersant on dry undispersed clay. These low molecular weight anionic polymers are very small in size; more than an order of magnitude smaller than the minimum size necessary for bridging flocculation of a clay. These small polymers enable more polymer (weight/weight) to be adsorbed on to the clay surface. This results in higher charge density on the clay surface giving the higher colloidal stability. A well dispersed clay slurry is made up of well dispersed, individual clay particles, and is free from flocculation.

One manifestation of the present invention is a coating composition containing bulked clay useful as a paper coating. It comprises clay, a carbonate such as calcium carbonate, titanium dioxide, starch and latex, and lubricants to prevent pick off or a cross-linker for the starch. A coating composition, in accordance with the present invention, typically comprises clay in an amount of 10 to 95%, a carbonate in an amount of 10 to 95%, titanium dioxide in an amount of 0 to 30%, starch in an amount of 0 to 5%, latex in an amount of 0 to 20%, lubricants such as calcium stearate, to prevent pick off in an amount of 0 to 2%, and cross-linkers, such as a modified glyoxal, in an amount of 0 to 1%. A minimum of about 7% binder level should be used. This includes the starch or latex or another binder occasionally used in paper such as a protein or casein. Any latex, starch, lubricant or carbonate conventionally used in paper manufacturing may be used. For example, a coating formulation for a publication grade might be 55% clay, 20% calcium carbonate, 5% titanium dioxide, 7% starch, 7% latex, 0.2% crosslinking agent and 0.8% lubricant.

By using the low molecular weight embodiment method of this invention, a coating with a high ink gloss is produced. In prior methods however, time consuming and costly methods such as using a centrifuge had to be used to remove the fine clay particles.

The present invention may use a commercially available polymer, but to, fully optimize the process, the charge density of an anionic polymer should be sufficient to maximize the colloidal stability of the agglomerates. In a preferred embodiment, the anionic polymer is selected from the group consisting of polyacrylates, polyacrylamides, polyethylene oxide and cellulose derivatives. The charge density of these polymers is typically low to moderate. The nonionic polymer is selected from the group consisting of polyethyleneoxide (PEO), polypropylene oxide (PPO) and cellulose derivatives. The acrylamides and cellulose derivatives may be anionic or nonionic based on the charges of their functional groups.

The resulting flocculated pigments of the present invention can be used to make exceptional coatings as a single layer or a double layer coating. In a double layer coating, a first coating is used to fill the pores and irregularities in the surface. This coating can be relatively inexpensive. A more expensive final surface coating is then provided to give the good opacity, brightness and printability properties. Thus, the first coating, also known as the "pre-coat", covers the base sheet so that the top coating is easier to apply. The top coating provides good optical properties. For example, $TiO_2$ may be added to the top coating for greater opacifying power. The two coatings employ the same clays and carbonates but the pre-coat may employ a cheaper binder. For example, the pre-coat may include more starch, less latex and less other additives. Both coatings are dried between applications since wet-on-wet coatings are messy. The dry coat provides a rigid surface with better coating properties.

In conclusion, bridging methods have several advantages over charge reduction and charge alteration methods for flocculating pigments. There is better compatibility with other additives in the coating since it is an anionic or nonionic material, not cationic. The flocculating agent when added to a coating composition does not increase the composition's viscosity nor limit the level of the flocculating polymer used. Traditional flocculation approaches used flocculants whose flocculating abilities were too intense causing undesirably high thickness, viscosity, and ionic properties for use as paper coatings. In contrast, the flocculants of the present invention have suitable solids composition to be used as suitable paper coatings having corresponding good viscosity, opacity, gloss, brightness and printability.

The clay pigments flocculated in accordance with the practice of the present invention are especially useful in preparing coating colors for coating lightweight publication papers, particularly magazine stock, to achieve coated papers having excellent opacity and printability.

The present invention is illustrated in more detail by the following example:

EXAMPLES

Example 1

Figure 1A:
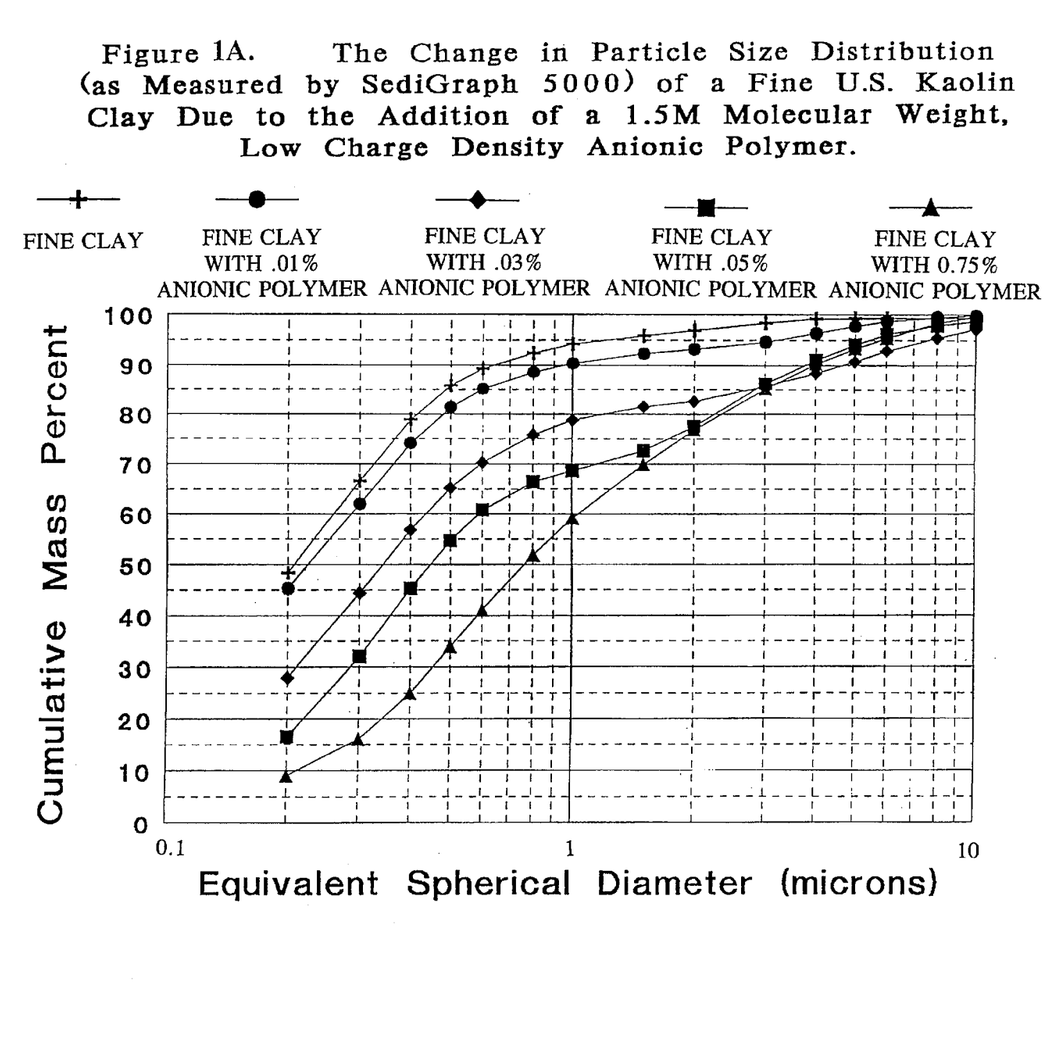
FIGS. 1A–1D are graphs of the advantages set forth in Example 1 of the present invention.
Figure 1B:
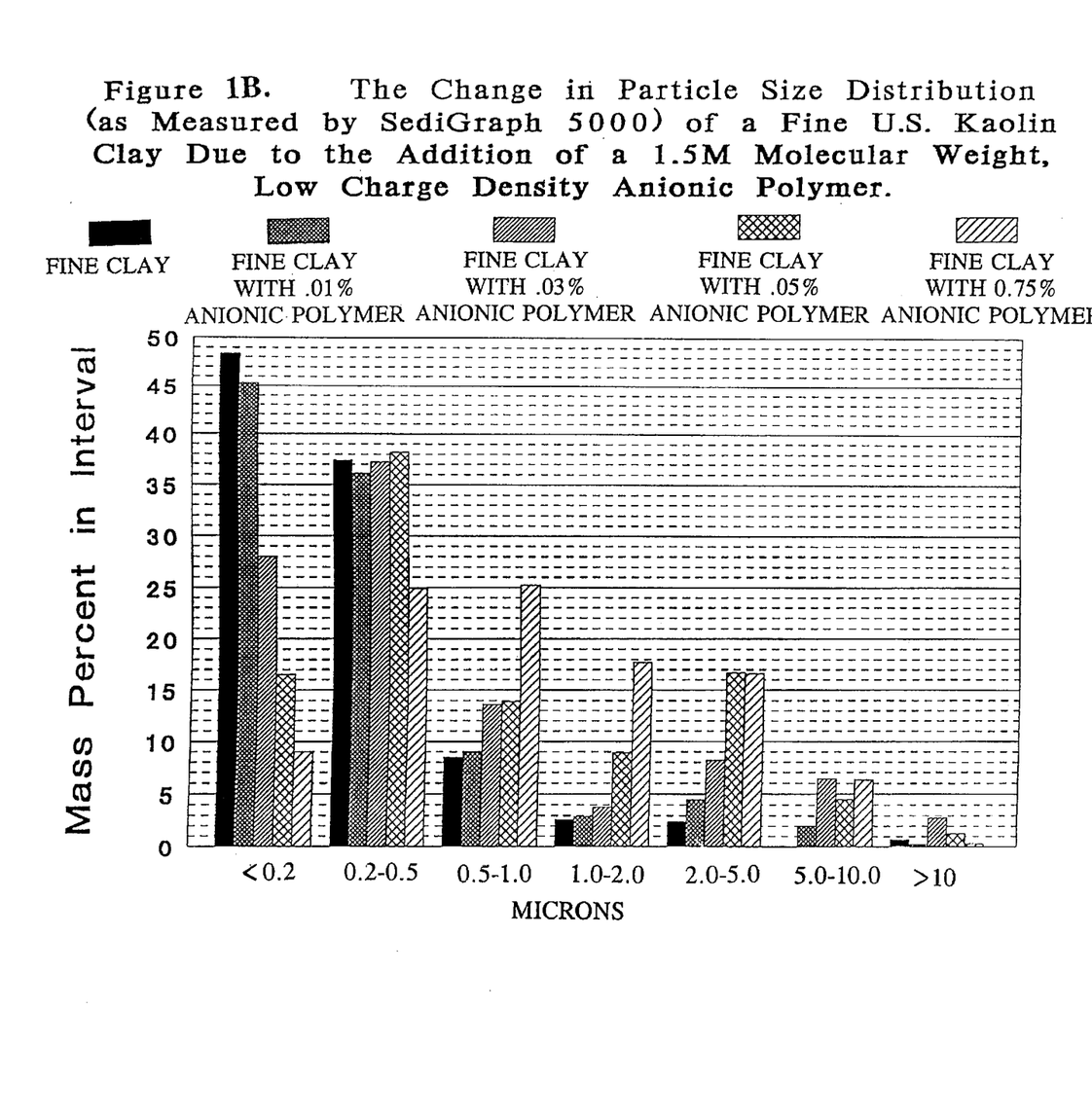
Figure 1C:
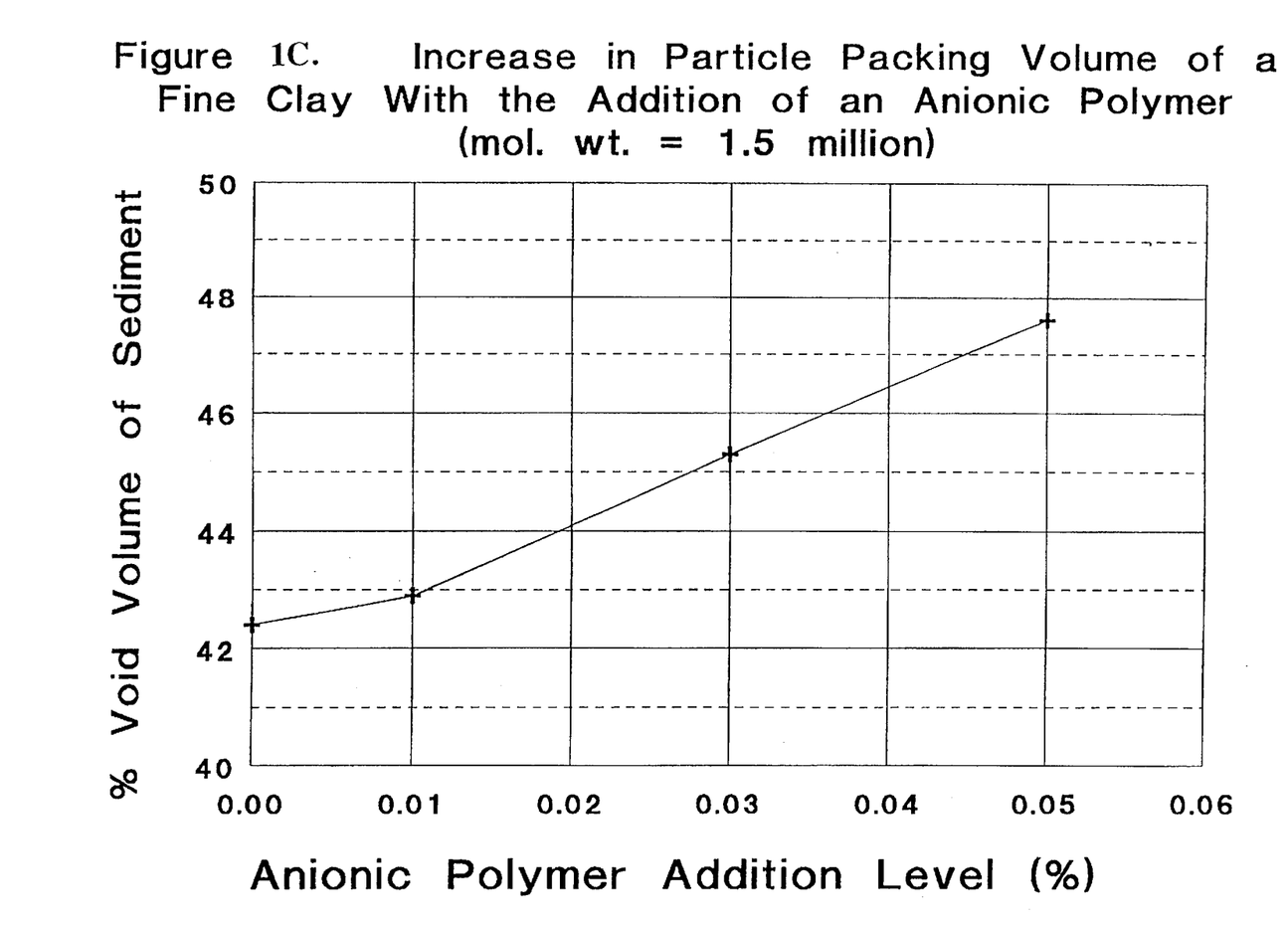
Figure 1D:
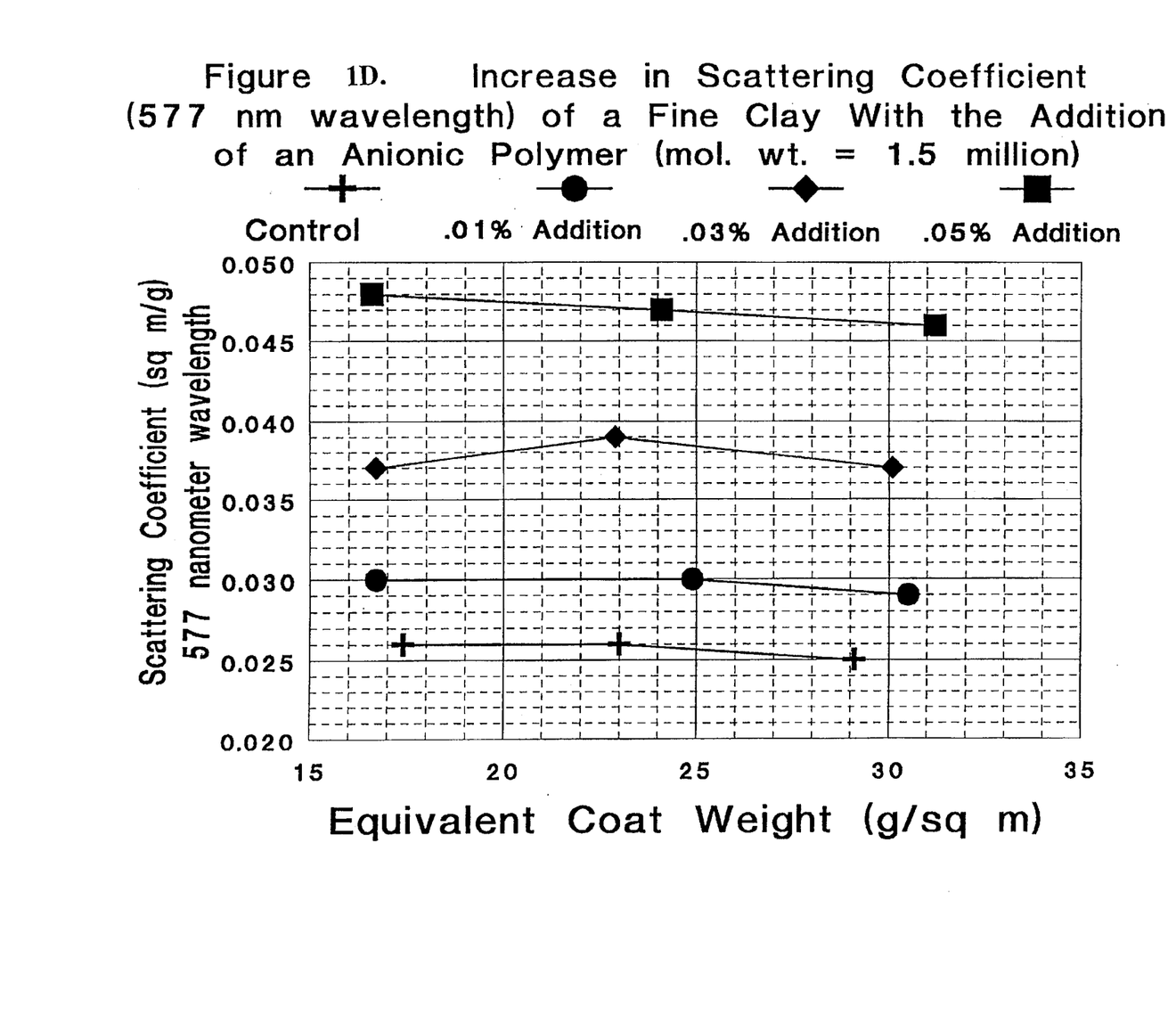

A fine U.S. kaolin coating clay is obtained fully dispersed as a 70% solids slurry. A master batch of the slurry is diluted to 60% solids. An anionic sodium polyacrylate polymer, with a molecular weight of about 1.5 million and a low to moderate charge density, is dissolved to make a 5% solids solution. The solution is added to 700 grams of the 60% solids concentration pigment slurry and mixed on a Cowels mixer for 10 minutes. Particle size analysis using the Sedigraph 5000 was performed to evaluate the effect of the flocculation caused by the anionic polymer on the particle size distribution of the clay. Seven percent solids samples are prepared and tested according to the TAPPI (Technical Association of the Pulp and Paper Industry) standard procedure. The resulting particle size distributions are shown in FIG. 1A. These curves show that the percentage of particles in the small end of the distribution decreases as the amount of polymer added increases. The same particle size information is presented differently in FIG. 1B. In this figure, it can be clearly seen that the percentage of particles less than 0.2 microns is strongly reduced by the polymer. Also, the figure shows that the 0.2 to 0.5 micron range is almost totally unaffected. This demonstrates selective flocculation of the fines. These fines are agglomerated to form particles mostly in the 0.5 to 5.0 micron range. The packing characteristics of the 60% solids slurries were tested using a sediment void volume analysis. The sediment void volume was determined by centrifuging alloquats containing 50 grams of clay (bone dry basis) at 5800 rpm for 90 minutes. Using the measured sediment volume, the clay density, and the sample bone dry weight, the void volume of the sediment was calculated. The results in FIG. 1C show that the sediment volume increases as the polymer addition level increases and that an addition level of 0.05% polymer, based on clay, gives an increase in void volume of 18%. These same 60% solids flocculated clay samples were applied to optically smooth black glass for scattering coefficient determination. The results are shown in FIG. 1D. The scattering coefficient at a light wavelength of 577 nm increases by more than 75%.

Example 2

Figure 2:
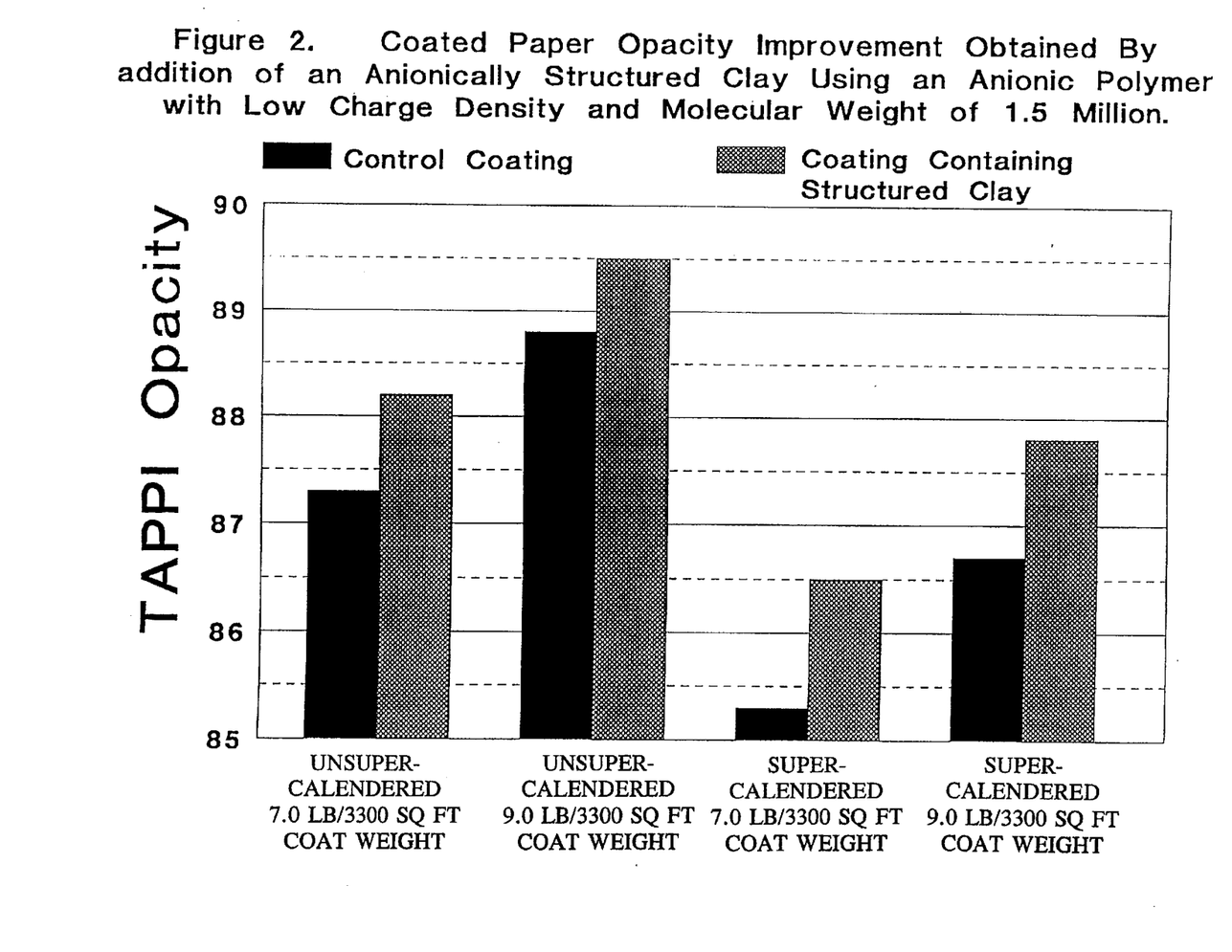
FIG. 2 is a graph of the opacity improvement of the present invention set forth in Example 2.

A paper coating is prepared by taking a 70% solids concentration pigment slurry consisting of 70 parts fine clay, 19 parts fine ground calcium carbonate, 5 parts coarse ground calcium carbonate, and 6 parts titanium dioxide. This is mixed on a Cowels mixer for 10 minutes and treated with 0.025% of an anionic polymer having a molecular weight of about 2 million. This is mixed under high shear for 10 minutes. Then 9 parts of a styrene butadiene latex and 7 parts ethylated starch are added. The resulting coating is applied to a groundwood-containing basesheet using a rigid blade coater running 2000 fpm. A control coating with no polymer added was made using the same formulation. The resulting coated sheets were tested for improvements in opacity. The results (FIG. 2) showed an improvement of about 1 point in opacity for the uncalendered and supercalendered sheets with both 7 and 9 lbs/3300 ft$^2$ of applied coat weight.

Example 3

Two identical coating formulations for sheet-fed printing are prepared consisting of approximately 60 parts fine clay and 40 parts fine ground calcium carbonate with small amounts of anatase titanium dioxide, polystyrene latex, and 13 parts styrene butadiene latex. To one of these coatings, a 1.5 million molecular weight anionic polymer with low charge density is added and mixed for 10 minutes with sufficient agitation. Both coatings are applied to a 48 lb/3300 ft$^2$ wood-free basesheet at 3000 fpm using a bent blade. The coatings are applied at a coat weight of 11 lbs per side. The resulting rolls of paper are supercalendered to a sheet gloss of about 72 and cut into sheets. The paper was tested and some of the paper was printed on a commercial sheetfed press. The results are shown in Table 3-1.

TABLE 3-1

| Measured Property | Control | Structured Coating |
|---|---|---|
| Sheet Gloss | 71.5 | 72.0 |
| Brightness | 85.6 | 87.2 |
| Opacity | 94.3 | 94.3 |
| Print Gloss - 100% ink coverage | 86.5 | 88.4 |
| Print Gloss - 200% ink coverage | 86.9 | 89.7 |
| Parker Print Surf - 10 kgf | 1.37 | 1.06 |
| Parker Print Surf - 5 kgf | 1.90 | 1.56 |
| Coating Application Solids | 64.1 | 62.5 |
| Coating Hercules Viscosity - E bob, 6000 rpm | 57.6 cP | 48.4 cP |
| Brookfield Viscosity - 100 rpm | 1300 cP | 960 cP |

The results in the above table show that adding an anionic polymer to a completed coating increases brightness and printed gloss and decreases roughness.

Example 4

Figure 3A:
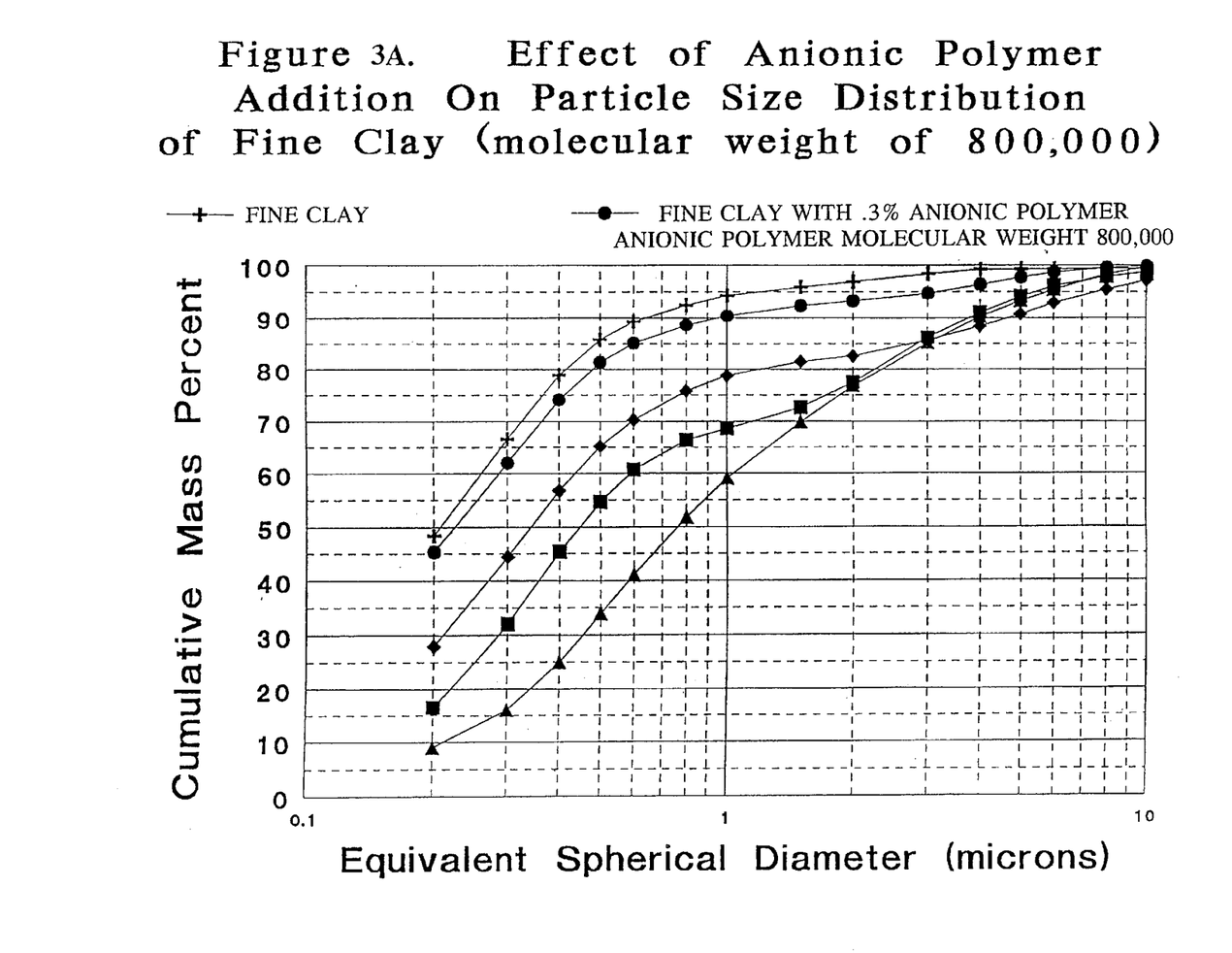
FIG. 3A–3B are graphs of the particle size distribution based on Example 4.
Figure 3B:
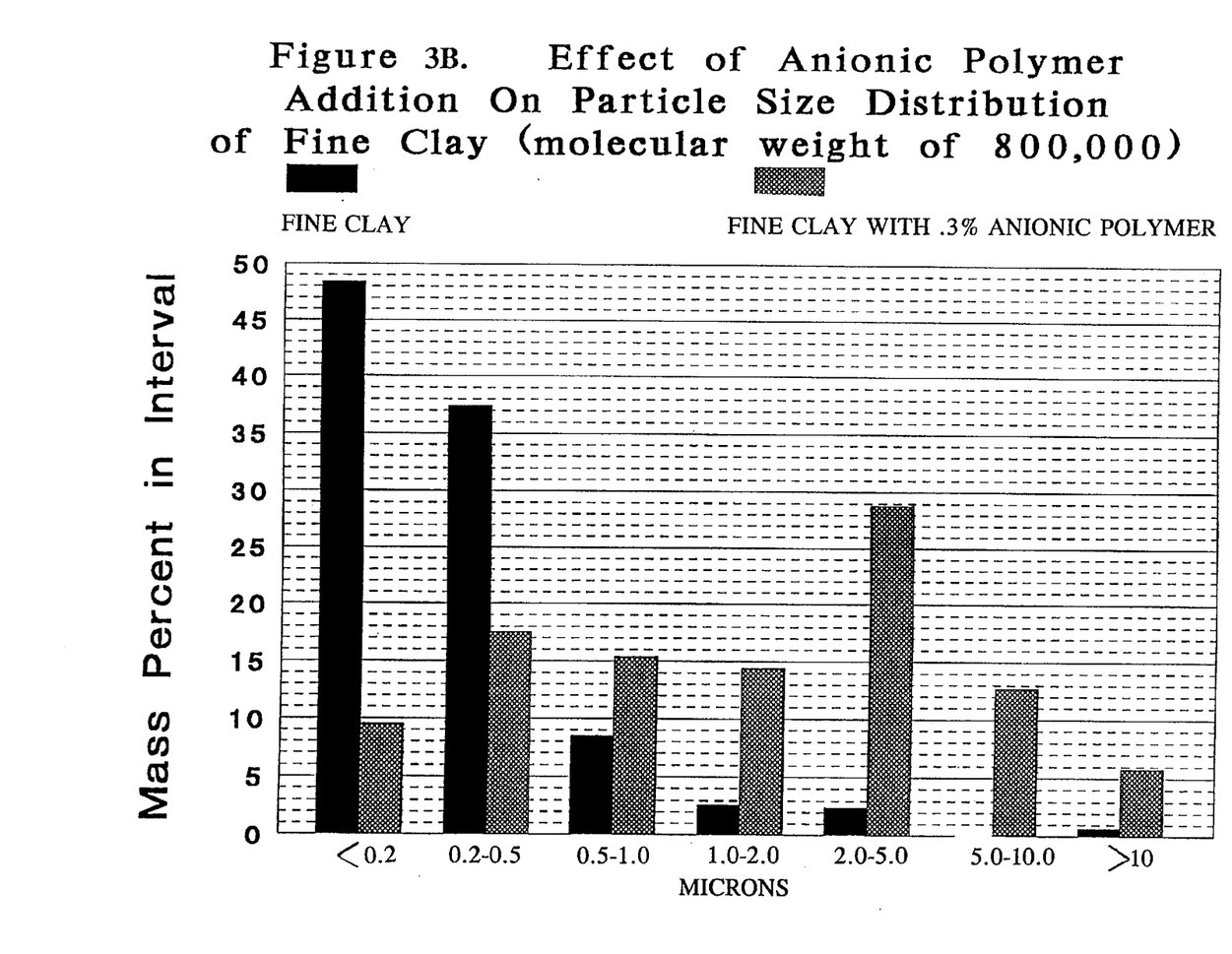

A fine U.S. kaolin clay is obtained fully dispersed as a 70% solids slurry. This slurry is diluted to 60% solids for treatment. An anionic sodium polyacrylate polymer, with a molecular weight of about 800,000 and a low to moderate charge density, is dissolved to make a 5% solids solution. The solution is added to 700 grams of the 60% solids concentration pigment slurries and mixed on a Cowels mixer for 10 minutes. Particle size analysis using the Sedigraph 5000 was performed to evaluate the effect of the flocculation caused by the anionic polymer on the particle size distribution of the clay. Seven percent solids samples were prepared and tested according to the TAPPI standard procedure. The resulting particle size distributions are shown in FIG. 3A. This figure shows that the percentage of particles in the small end of the distribution decrease as the amount of polymer added increases. The same particle size data is presented differently in FIG. 3B. In this figure, it can be clearly seen that the percentage of particles which are less than 0.2 microns is strongly reduced by the polymer. This demonstrates preferential flocculation of the fines. These fines are agglomerated to form particles mostly in the 0.5 to 5.0 micron range. The addition level of polymer used was high to demonstrate the maximum possible effect. The results are comparable to the highest addition level of a 1.5 SM molecular weight polymer used in Example 1.

Example 5

Figure 4A:
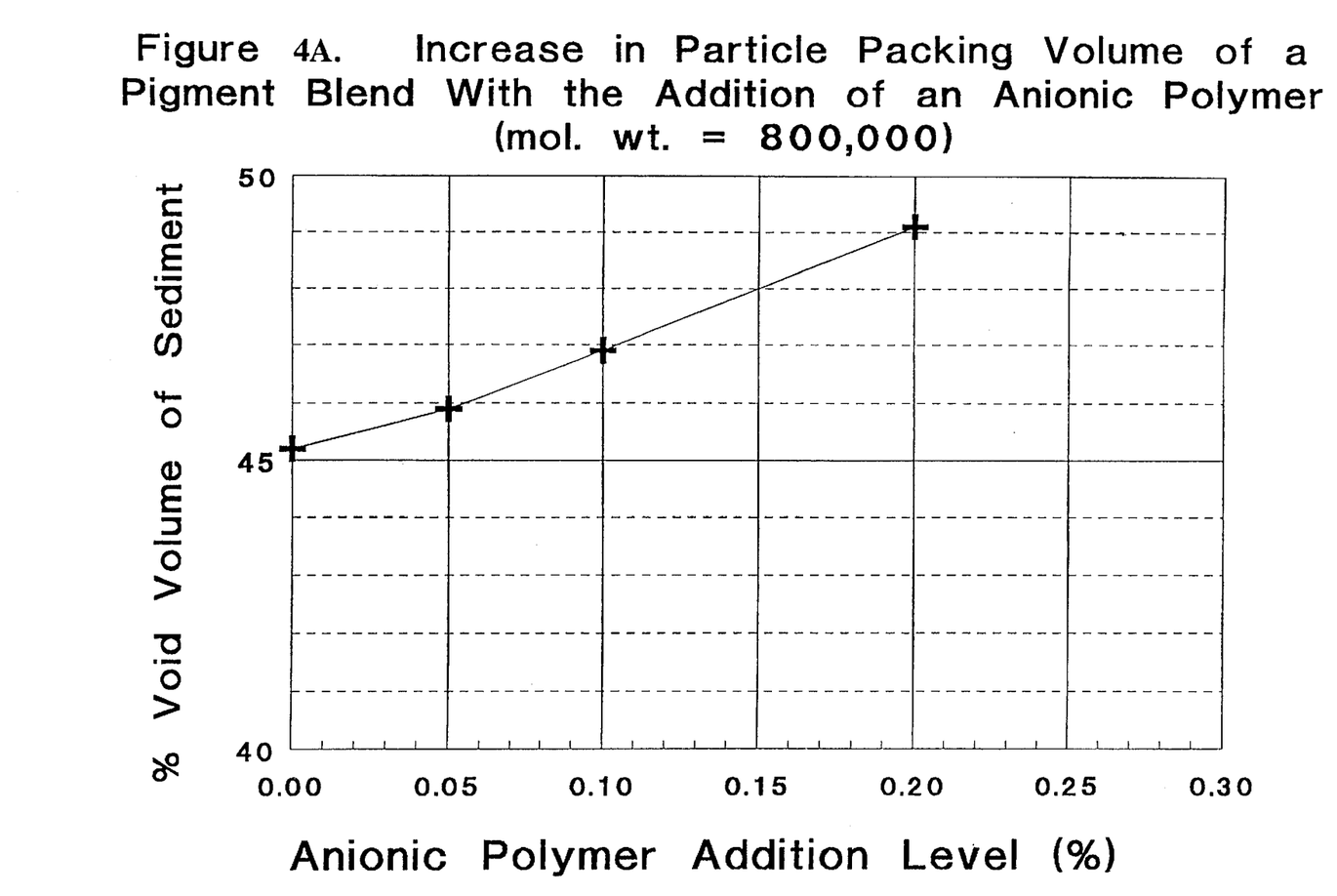
FIGS. 4A–4B are graphs of the advantages set forth in Example 5.
Figure 4B:
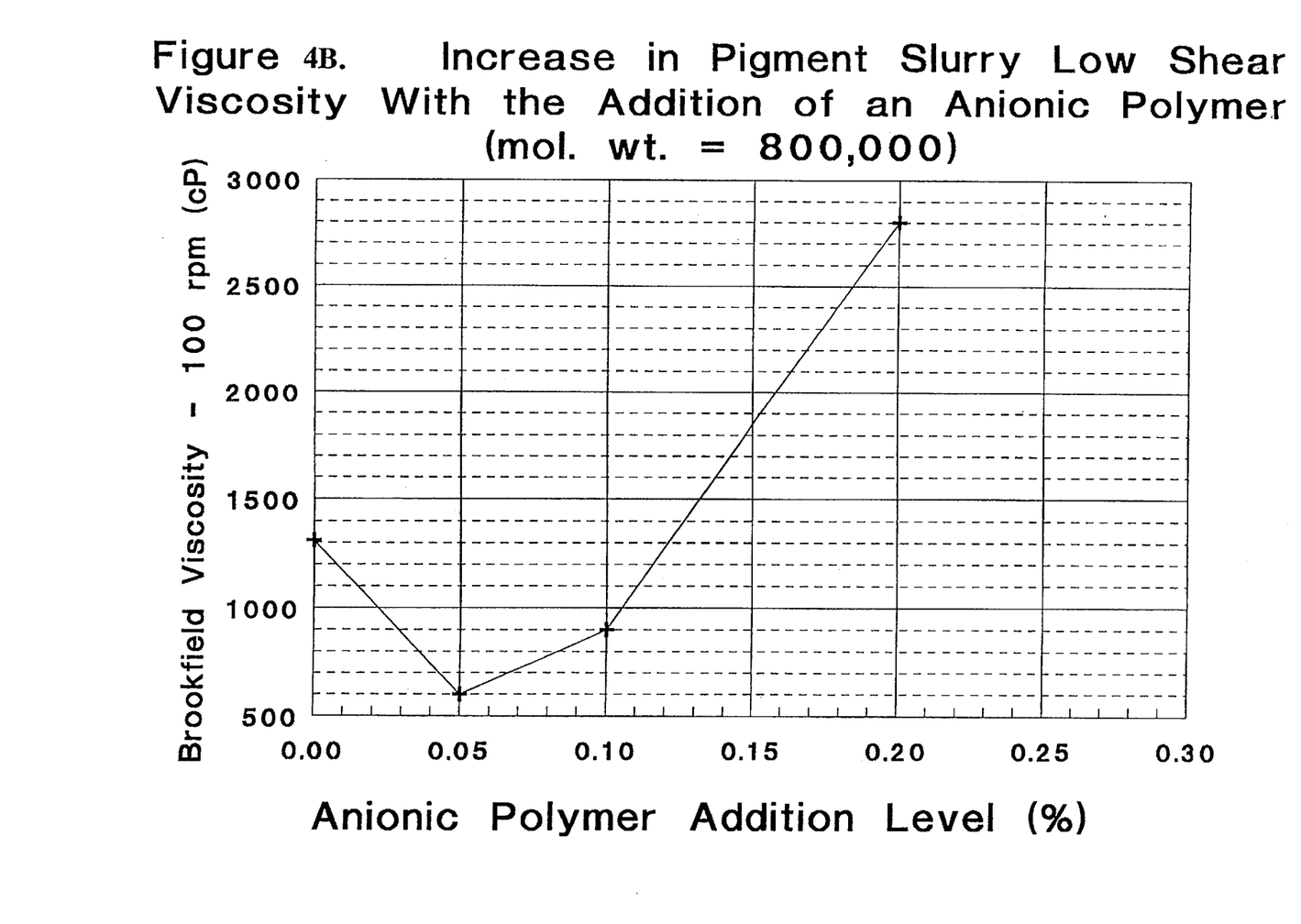

A 70% solids concentration pigment slurry consisting of 70 parts fine clay, 19 parts fine ground calcium carbonate, 5 parts coarse ground calcium carbonate, and 6 parts anatase titanium dioxide is mixed using a Cowels mixer for 10 minutes. A portion is diluted to 60% solids and samples of this are treated with 0.05, 0.1 and 0.2% of an anionic polymer with molecular weight of about 800,000. The slurries are mixed for 10 minutes after the polymer is added. The samples are centrifuged in the manner described in Example 1. The sediment volume increases as the polymer addition increases due to the change in particle size distribution. See FIG. 4A. The viscosity of these slurries initially decrease, but viscosity is increased once the degree of flocculation is enough to significantly narrow the particle size distribution. See FIG. 4B.

Example 6

Figure 5A:
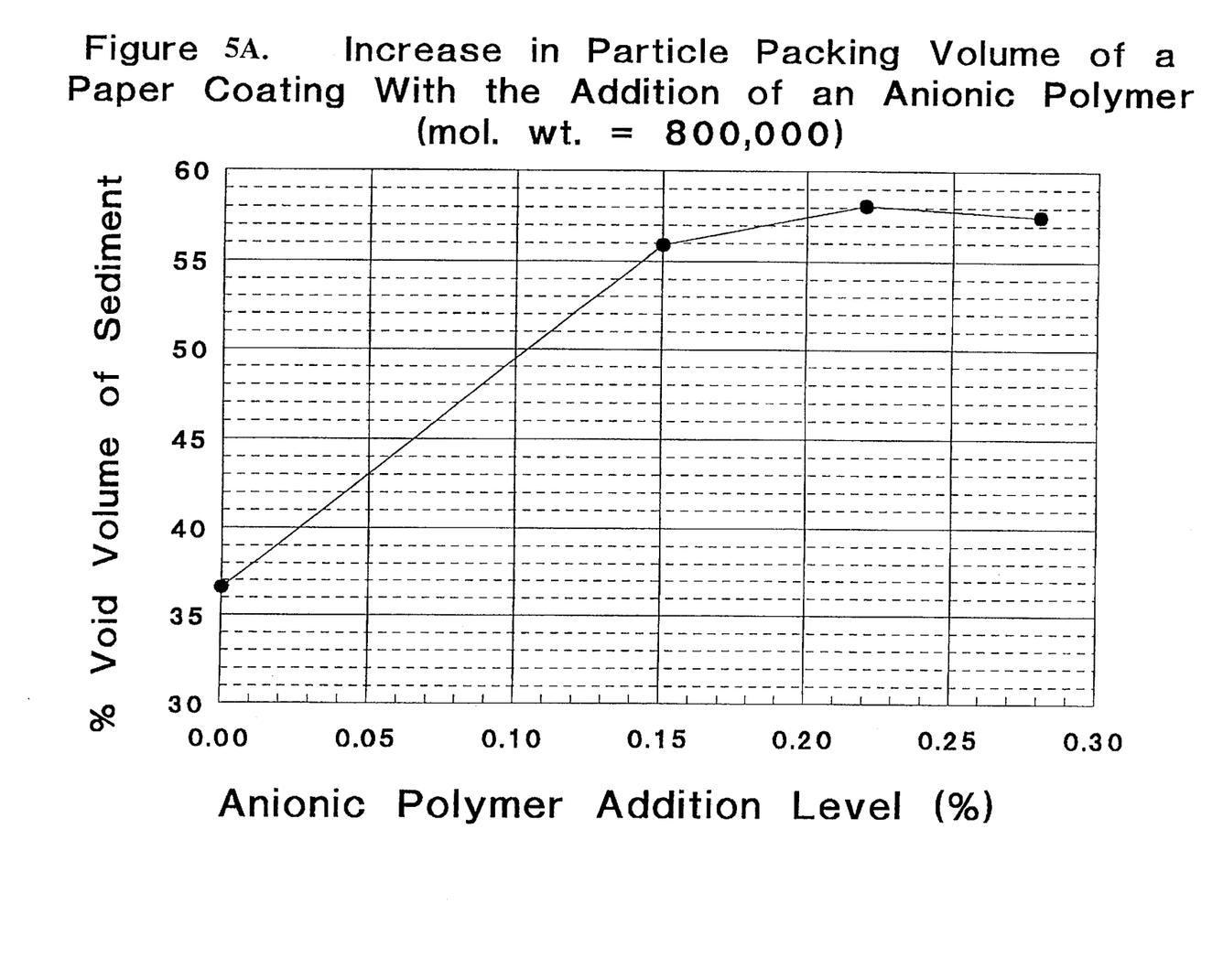
FIGS. 5A–5B are graphs of the advantages set forth in Example 6.
Figure 5B:
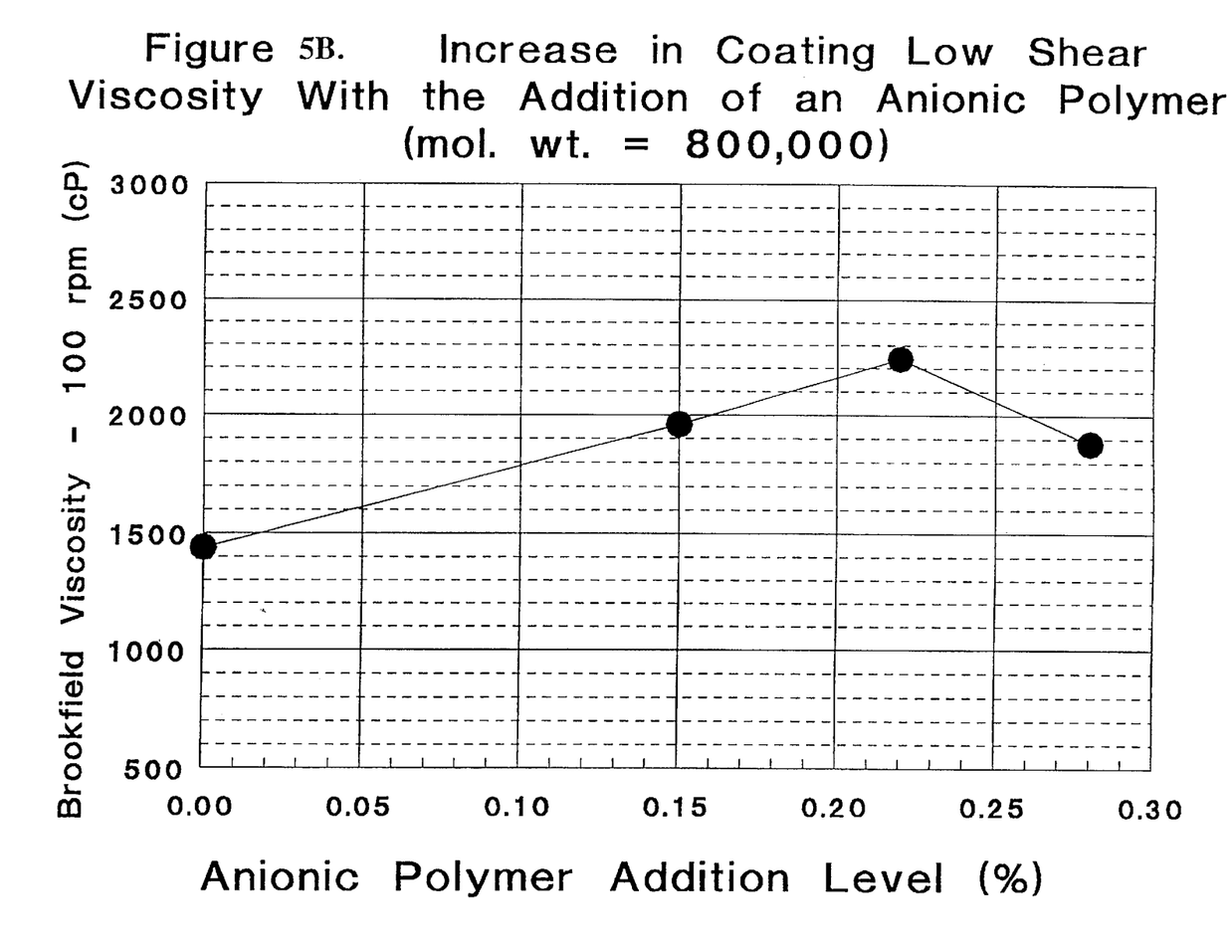

A paper coating using a pigment blend of 70 parts fine clay, 19 parts fine ground calcium carbonate, 5 parts coarse ground calcium carbonate, and 6 parts anatase titanium dioxide and a binder system of 7 parts starch and 9 parts styrene-butadiene latex is made. The completed coating is then split into portions that are treated with 0.15, 0.22, and 0.28% anionic polymer having molecular weight of about 800,000. The resulting flocculated coatings are centrifuged and the sediment void volume determined by the method described in Example 1. The void volume increases rapidly with increased polymer addition level (FIG. 5A). The increased void volume for the coating is substantially greater than the increase seen for the pigment blend in Example 5. Brookfield low shear viscosity was measured on the coatings (FIG. 5B) and the results show a mild increase in viscosity as the polymer addition level increases.

Example 7

Figure 6:
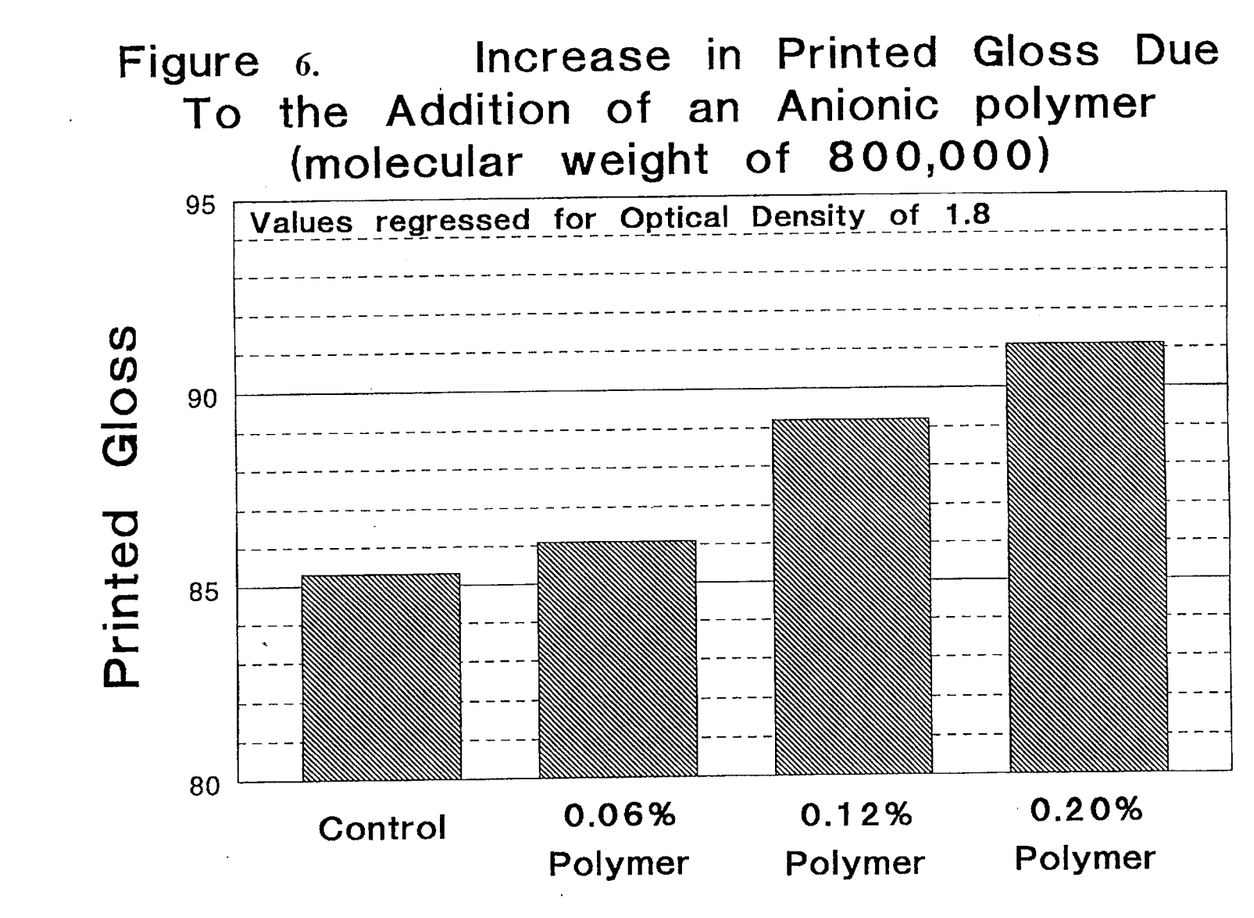
FIG. 6 is a graph of increase in print gloss in accordance with Example 7.

A coating whose pigment portion was made up of predominantly fine kaolin clay, with about 10 parts fine ground calcium carbonate and 5 parts titanium dioxide with 6 parts latex and 6 parts styrene butadiene latex as the binder is prepared. Three additional, identical coatings are made except that an anionic polymer is added to these coatings after they are prepared at addition levels of 0.06, 0.12, and 0.20% based on dry coating. The polymer is an anionic sodium polyacrylate with low to moderate charge density and a molecular weight of about 800,000. The coatings are applied to a 32 lb/3300 ft$^2$ basis weight wood-containing base sheet at a coat weight of about 9 lbs/3300 ft$^2$. Sheet gloss, smoothness, opacity and brightness are all equivalent, but the sheet coated with the polymer containing coatings gives higher printed gloss when printed by the Prufbau Printability tester. The highest addition level, 0.20% gives an increase in printed gloss of about 6 points (FIG. 6).

Example 8

Figure 7:
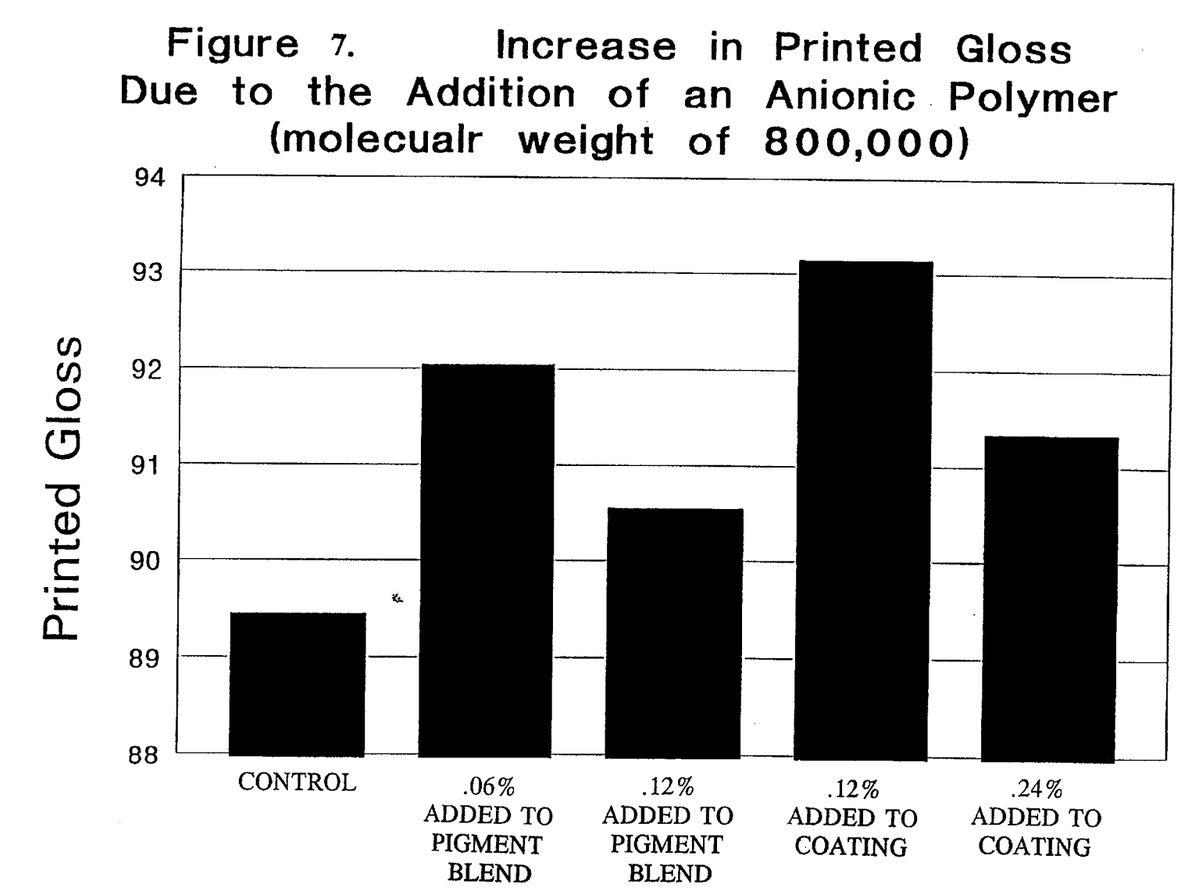
FIG. 7 is a graph of increase in print gloss in accordance with Example 8.

The same control coating formulation and anionic polymer as Example 7 is used. In this experiment, 2 coatings are made as before with polymer added at 0.12 and is 0.24% of total to the coating after it is completed. Two other coatings are made where the clay, calcium carbonate and titanium dioxide are mixed together then the polymer is added as 0.06 and 0.12% of total to this pigment blend. After sufficient mixing, the other coating ingredients are added. Again, all sheet properties are equivalent except for printed gloss (FIG. 7). The addition of the polymer to the pigment blend or the finished coating increases ink gloss.

What is claimed is:

1. A method for making a structured clay comprising the steps of:
preparing an aqueous dispersion of a processed anionic, kaolin clay containing an anionic or nonionic polymer as a flocculating agent, said polymer having a molecular weight in the range of about 400,000 to about 1,500,000 and being present in an amount sufficient to cause bridging of particles of the clay in said dispersion by said polymer; and mixing said dispersion to cause said polymer to bridge said particles and said particles to flocculate.

2. The method of claim 1 wherein said step of preparing said dispersion includes adding a dispersant to a processed clay and said polymer is added to said clay with said dispersant or subsequent to adding said dispersant.

3. The method of claim 2 wherein said polymer is anionic.

4. The method of claim 2 wherein said polymer is nonionic.

5. The method of claim 2 wherein said polymer has a molecular weight in a range of about 750,000 to about 1,500,000.

6. The method of claim 2 wherein said polymer has a molecular weight in a range of about 400,000 to about 600,000.

7. A structured clay produced by the method of claim 1.

8. A paper coating composition containing a structured clay prepared by the method of claim 1.

9. The coating composition of claim 8 where said clay is present in said composition in an amount of about 20 to 70%.

10. The method of claim 2 wherein said method includes the additional step of drying said dispersion to form a slurry.

11. The method of claim 10 wherein said slurry contains about 64 to 70% solids.

12. A method for preparing coated paper comprising the steps of:
preparing an aqueous dispersion of an anionically dispersed kaolin clay;
adding thereto an anionic or nonionic polymer in an amount sufficient to cause flocculation of said clay by bridging said clay with said polymer, said polymer having a molecular weight in the range of about 400,000 to about 1,500,000;
removing water from the dispersion to provide a slurry;
preparing a paper coating composition from said slurry; and
depositing said composition on paper.

13. The method of claim 12 where said polymer is an anionic polymer.

14. The method of claim 12 where said polymer is an non-ionic polymer.

15. The method of claim 13 where said anionic polymer is selected from the group consisting of polyacrylate, and polyacrylamide.

16. The method of claim 14 where said non-ionic polymer is selected from the group consisting of polyethyleneoxide polypropylene oxide.

17. The method of claim 12 where said polymer is added in an amount of about 0.1 to 1 part per 100 parts pigment.

* * * * *